Feb. 22, 1966  N. N. FENDER  3,236,120
PARKING BRAKE CONTROL
Filed April 22, 1963  2 Sheets-Sheet 1
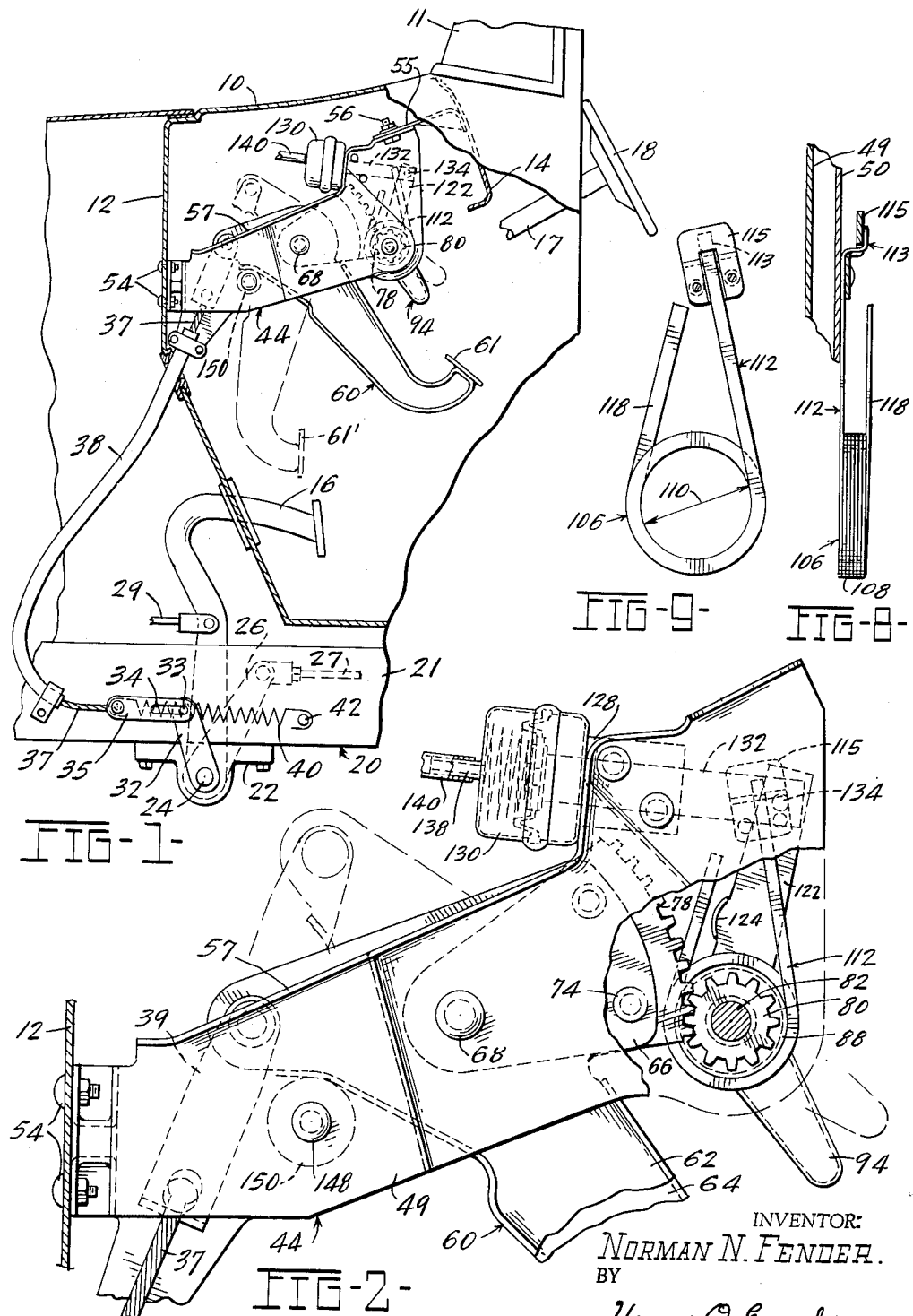
INVENTOR:
NORMAN N. FENDER.
BY
Harry O. Ernsberger
ATT'Y.

Feb. 22, 1966   N. N. FENDER   3,236,120
PARKING BRAKE CONTROL
Filed April 22, 1963   2 Sheets-Sheet 2
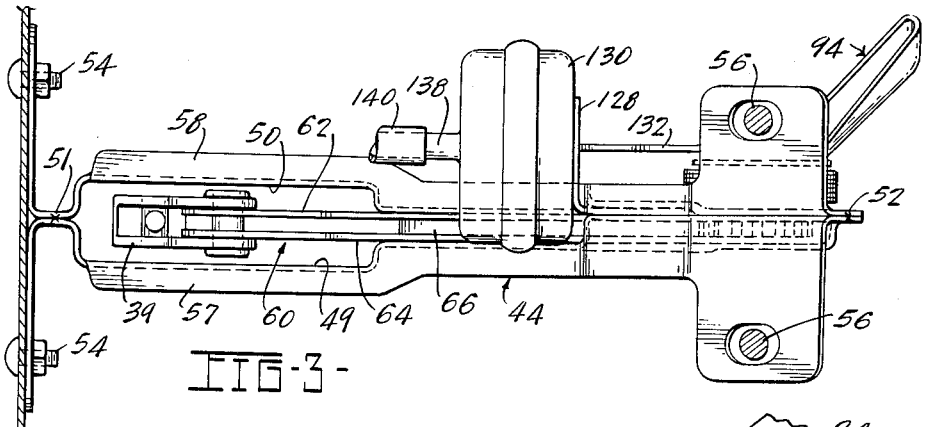
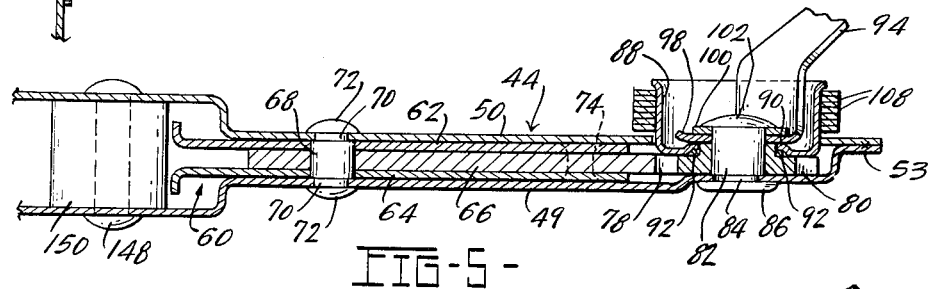
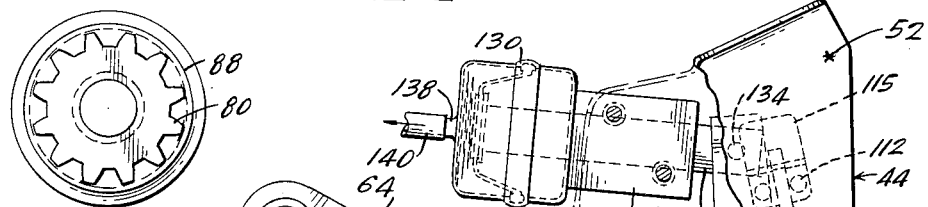
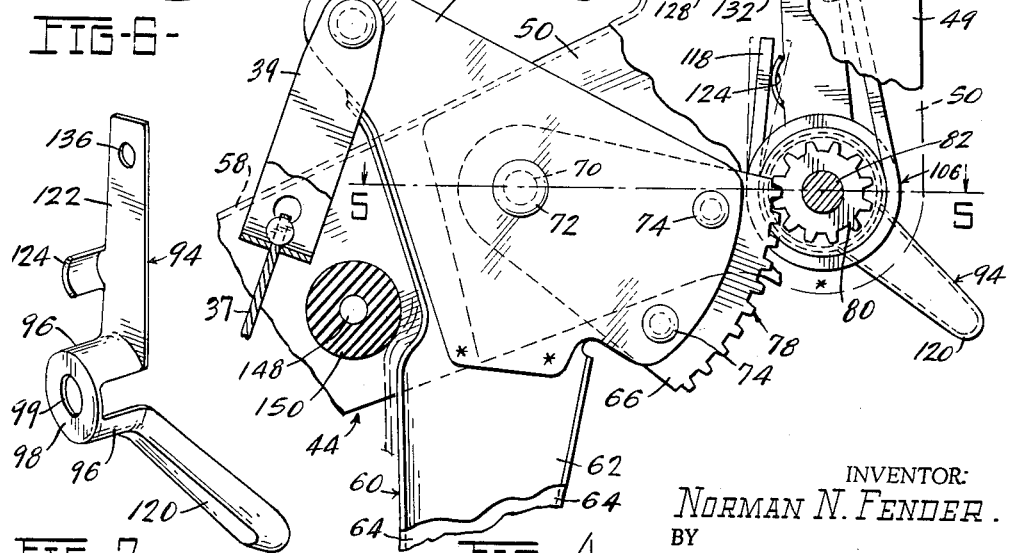
INVENTOR:
NORMAN N. FENDER.
BY
Harry O. Ernsberger
ATT'Y.

United States Patent Office 3,236,120
Patented Feb. 22, 1966

3,236,120
PARKING BRAKE CONTROL
Norman N. Fender, Erie, Mich., assignor to Universal American Corporation, New York, N.Y., a corporation of Delaware
Filed Apr. 22, 1963, Ser. No. 274,689
6 Claims. (Cl. 74—531)

This invention relates to mechanism control and more especially to a method of and mechanism for actuating and controlling the parking brakes of a vehicle.

Several types of manually-operated and foot-operated mechanisms and devices have been developed for actuating and controlling the parking brakes of automotive vehicles. Such manually-operated or foot-operated mechanisms have involved the use of a brake actuating member or lever in conjunction with a means or device for holding the member or lever in brake setting positions and wherein such means or device is releasable to release the parking brakes. Member or lever retaining means such as ratchet and pawl mechanisms and friction rollers have been developed and utilized extensively in vehicle parking brake actuating arrangements.

Ratchet and pawl mechanisms have several disadvantages in that the ratchet and pawl teeth are subject to wear and the spaces between adjacent ratchet teeth collect dirt and foreign matter which condition may impair the satisfactory operation of such mechanisms.

Furthermore, toothed rack or ratchet and pawl means provides only stepped increments, equal to the spacing between adjacent teeth, for holding the parking brake in set position and, in many instances, the setting of the brake may be ineffective because of the inability of an operator to exert the requisite force to properly set the brakes. The roller types of member or lever retaining mechanisms provide satisfactorily operating means but are costly to manufacture. The trend in brake design is to substantially increase brake pressures with a consequent increase in the force required to release the brake setting means, a factor which augments the difficulties of providing a retaining means which is readily releasable.

Endeavors have been made to utilize a coil spring surrounding a drum co-axial with the foot pedal or lever fulcrum in order to provide a retaining means for parking brake mechanism. Tests of this type of lever retaining means have shown that in order to have an operable construction the drum about which the coil spring is wound must be of comparatively large diameter, and a comparatively heavy spring of substantial cross section is necessary in order to provide effective force to hold the brake in set position. Furthermore in constructions of this character it has been found that excessive brake cable "back-off" is encountered, that is, the movement of the brake actuating cable in a brake releasing direction occurring during the period that the spring wraps itself tightly onto the drum.

Thus, in such constructions the vehicle operator actuates a member or lever to set the parking brakes, but the lost motion of the coil spring in frictionally gripping the drum affects a partial release of the brakes because of cable "back-off," rendering the construction unsafe for automotive use.

The present invention embraces a method of controlling parking brake mechanism of an automotive vehicle wherein the brake mechanism is held in brake setting positions by frictional engagement between a retaining member and a movable surface, actuated by movement of a brake setting means, whereby the parking brake mechanism may be reliably held in brake setting positions and release of the brake mechanism effected with a minimum of effort by the vehicle operator.

Another object of the invention resides in a method of frictionally retaining or holding a parking brake mechanism of a wheeled vehicle in set positions through the medium of a movable surface actuated by the parking brake actuator engaged by a retaining or locking element tensioned to hold or retain the brake mechanism in any position, and release of the brake mechanism effected by distortion or movement of the element whereby a minimum of effort is required to release the parking brake mechanism.

Another object of the invention embraces a method of frictionally retaining or holding a parking brake mechanism of a vehicle in set positions through the employment of a movable surface actuated by a brake actuating member through the use of motion multiplying media wherein the movable surface is frictionally engaged by a retaining or locking element prestressed and configurated to hold or lock the brake actuator in brake setting positions with reduced applied force, and release of the brake actuating member effected by distortion or flexure of the prestressed element through a minimum of effort or force applied by the vehicle operator or by a servomotor or other motive power means.

Another object of the invention is the provision of a mechanism control embodying an actuating member adapted to be connected with means to be controlled and arranged to drive a movable surface through motion multiplying means in association with a coiled spring element pre-stressed to frictionally lock the surface and the brakes in set position and release means arranged to distort or flex the spring element in a direction to reduce the friction between the spring element and the surface to release the actuating member for movement toward brake release position.

Another object of the invention resides in the provision of a brake retaining and release means for a parking brake mechanism wherein a member is rotated through motion multiplying means by a brake lever or actuator during its movement toward brake setting positions and wherein the rotatable member is retained by a coil spring normally stressed to frictionally engage and grip the rotatable member to hold the brakes in set position and wherein a distal region of the spring may be actuated to flex or distort the spring with a minimum of effort to release the spring from frictional engagement with the member and thereby release the parking brake mechanism.

Another object of the invention resides in a parking brake control mechanism embodying a brake actuating means associated with a motion multiplying instrumentality for rotating a drum, a coiled element embracing the drum and arranged to frictionally lock the drum to retain the parking brakes in set positions in combination with release means movable to effect a release of frictional engagement of the coiled element with the drum to release the drum for movement toward brake release position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle with certain portions broken away, illustrating one form of mechanism control for carrying out the method of the invention;

FIGURE 2 is an enlarged side elevational view of the mechanism control illustrated in FIGURE 1;

FIGURE 3 is a top plan view of the construction shown in FIGURE 2;

FIGURE 4 is a view similar to FIGURE 2 showing the components or parts in brake setting position;

FIGURE 5 is an enlarged sectional view taken substantially on the line 5—5 of FIGURE 4;

FIGURE 6 is an elevational view of a drum and pinion construction forming a component of the invention;

FIGURE 7 is an isometric view of a release member for the brake retaining means;

FIGURE 8 is a side elevational view of a coiled element forming a component of the invention, and FIGURE 9 is a front elevational view of the construction shown in FIGURE 8.

While the method and mechanism control of the invention are particularly adapted for use in actuating or controlling the emergency or parking brakes of a vehicle, it is to be understood that the method and mechanism control of the invention may be utilized for actuating and controlling other apparatus wherever the same may be found to have utility.

Referring to the drawings in detail and initially to FIGURE 1, there is illustrated an installation of a form of the invention in the operator's compartment of an automotive vehicle. The portion of the vehicle illustrated is inclusive of a cowl 10, a windshield 11, a dashboard or firewall 12, an instrument panel 14, a service brake pedal or lever 16, a steering post 17 and a steering wheel 18. The chassis frame 20 is inclusive of parallel frame side members, one of which is shown at 21, which are joined by cross members or struts (not shown) of conventional construction.

Secured to the side frame members 21 are brackets 22, one of which is shown in FIGURE 1, the brackets journally supporting a transversely extending rod or shaft 24. Fixed upon the shaft 24 is an arm 26 connected by a rod 27 or other suitable means with the vehicle parking brakes which are associated with a pair of road wheels (not shown), the parking brakes being of conventional construction.

The service brakes of the vehicle are adapted to be operated by a brake pedal 16 which may be journaled on the shaft 24, a rod 29 connected thereto being arranged to actuate conventional hydraulic means (not shown) for setting the service brakes of the vehicle. Secured on the shaft 24 is a second arm 32 provided at its distal end with a pin 33 arranged to traverse a slot 34 provided in a link 35.

The link 35 is connected to the lower end of a flexible cable 37 enclosed in a tubular sheath 38, the opposite end of the cable 37 being equipped with a clevis 39 for connection with the parking brake actuating and controlling mechanism hereinafter described.

One end of a contractile spring 40 is connected with the link 35 and the other end of the spring anchored by means of a pin 42 secured to one of the side frame members 21. The spring 40, in conjunction with the conventional brake shoe retracting springs (not shown) normally biases the link 35 in a right-hand direction as viewed in FIGURE 1 toward parking brake release position.

The parking brake actuating and controlling mechanism is mounted on a support 44 fashioned of two mating sections 49 and 50 formed of sheet metal which are welded together at regions 51 and 52, shown in FIGURE 3. The forward ends of the support sections 49 and 50 are secured to the dashboard by means of bolts 54, and the rear ends of the support sections being secured to a bracket 55 by means of bolts 56, the bracket being welded or otherwise secured to the instrument panel 14 or other suitable anchoring member. The upper regions of the support sections 49 and 50 are respectively formed with transversely extending reinforcing flanges 57 and 58.

The brake actuating or control mechanism includes a brake actuator, lever or member 60 arranged for movement relative to the support 44 and, in the embodiment illustrated, is in the form of a foot-operated lever having a foot pad portion 61.

The member or lever 60, in the embodiment illustrated, is formed with a primary section 62, preferably of U-shaped cross section provided by flanges to which is secured a secondary section 64, the main and primary sections being spaced to accommodate a plate member or element 66. The plate member 66 and the lever sections 62 and 64 are formed with aligned openings to accommodate a fulcrum member or pin 68, shown particularly in FIGURE 5, of cylindrical shape.

The fulcrum member 68 is fashioned with tenons 70 extending respectively through openings formed in the support sections 49 and 50, the end regions of the tenons being swaged in assembly to form heads 72, as shown in FIGURE 5. Through this arrangement, the lever 60 is fulcrumed on the support 44. The plate member 66 is arranged to be actuated by movement of the member 60 and is preferably secured to the lever sections 62 and 64 by means of rivets 74 but may be welded thereto. The plate 66 is fashioned with an arcuately shaped region having a plurality of teeth constituting a rack portion 78 the teeth of which are in mesh with the teeth of a gear or pinion 80 spaced from the member 60.

The pinion 80 is journally mounted on the support section 49 by means of a journal pin 82 of cylindrical shape, the pin 82 having a tenon portion 84 of reduced diameter extending through an opening in the support section 49 and is swaged during assembly to form a head 86 whereby the journal pin 82 is fixedly secured to the support section 49. A cup-shape member or drum 88 formed of sheet metal is fashioned with a hub portion 90 which fits over a tenon portion of the gear or pinion 80 and is welded to the gear by welding indicated at 92.

The arrangement is inclusive of a release means or member 94 for the lever retaining means to be hereinafter described, the lever means 94 being particularly shown in FIGURE 7. The member 94 is provided with a partial cylindrically shaped region 96 which extends within the interior of the cup-shaped member or drum 88, the region or portion 96 terminating in an inwardly extending flange or disc-like portion 98 fashioned with an opening 99. As shown in FIGURE 5, the journal member 82 extends through the opening 99 in the portion 98 and through a washer 100, member 82 being fashioned with a head 102.

Thus, with respect to FIGURE 5, it will be seen that the member 82 provides a journal support for the gear 80, drum 88 and the release member 94, the gear 80 and drum 88 forming a rotatable unit as they are welded together. A retaining or locking means 106 is associated with the drum 88 and is frictionally engageable therewith for retaining or holding the parking mechanism in brake setting positions.

In the embodiment illustrated, the retaining means or locking member 106 is inclusive of a coiled spring or element, having a series of close convolutions 108, the material providing the member 106 being comparatively thin in comparison to its width, as particularly shown in FIGURES 8 and 9. The convolutions 108 are flat and are in close relation as shown in FIGURES 5 and 8.

The interior diameter 110 of the coil spring or coiled element 106 is of a dimension to snugly fit onto the exterior cylindrical surface of the drum 88, the regions of the convolutions 108 engaging the drum being preferably rounded.

The brake actuator retaining means or locking element 106 has a projecting terminal portion or leg 112 forming a continuation of the coil or spring portion which has a transverse portion 113 anchored in a slot in the support 44 and is secured in the slot by a plate 115 welded to the support member 50. The other end region of the retaining means 106 is fashioned with a terminal portion 118 of rectilinear shape which is unsecured and is free of the support means, as shown in FIGURES 2 and 4.

The convolutions of the drum locking or retaining element or coil spring 106 are hardened or tempered in a prestressed or tensioned condition whereby the spring convolutions inherently frictionally grip the exterior surface of the drum 88, the gripping characteristics of the spring being adequate to retain or hold the parking brakes in set position. In the embodiment illustrated, the spring element 106 is coiled in a direction whereby the drum 88 may be comparatively easily rotated by movement of the brake setting lever 60 in a clockwise direction, which, through the motion multiplying or force reducing media provided by the rack portion 78 and pinion 80, amplifies the relative movement or rotation of the pinion 80 compared to the angular distance through which the brake actuator is moved in setting the brakes and proportionately reduces the force required to hold or retain the drum in position to which it is moved in setting the brakes.

The movement of the brake actuating lever or member 60 toward brake setting position tends to unwind the coiled element 106 to readily permit setting the brake mechanism. As soon as rotation of the drum 88 ceases in brake setting position, the inherent stress or prestressed condition of the coiled region of the element 106 causes the convolutions 108 to frictionally grip the drum and prevent release of the brake mechanism or the brake setting member 60.

The coiled element or retaining means 106 may be quickly released simply by moving the distal portion 118 slightly in a left-hand direction, as viewed in FIGURES 2 and 4, which effects a slight unwinding of the convolutions and release of the frictional grip of the convolutions 108 on the drum to an extent that the tension in the spring 40 and the conventional brake shoe springs moves the member 60 to its initial position and releases the parking brakes.

The control means or member 94 is for the purpose of effecting release of the coiled element or locking means 106 from its frictional grip on the drum 88 to release the brake mechanism. The release member 94 is provided with a projecting portion 120 which may be hand-operated or foot-operated to effect slight rotational movement of member 94 about the axis of the journal pin 82 in releasing the frictional grip of the coiled element 106 on the drum 88. A second projecting portion 122 of member 94 has a laterally extending lug or projection 124 disposed so as to engage the distal portion 118 of the locking means or coiled element 106 upon slight counterclockwise movement of member 94.

It is found that only a very slight relative movement of the distal portion 118 of the locking or retaining means 106 is sufficient to substantially eliminate or render ineffective the frictional grip of the convolutions 108 on the drum 88 so that the brake springs return the lever or member 60 to its initial position, the tooth rack 66 causing clockwise rotation of the pinion 80 during brake release movement of the member 60. Furthermore, it requires only a slight force of but a few pounds applied to the projection 120 of the release member 94 to move the distal portion 118 and distort the convolutions 108 to effect release of the drum 88.

Means is provided to effect power release of the locking means or coiled element 106. Secured to the support component 50 is a bracket 128 upon which is mounted a servo-motor 130 which may be of conventional fluid actuated diaphragm type wherein one wall of a chamber within the housing 130 is provided by a flexible diaphragm. The diaphragm of the servo-motor 130 is connected to a rod 132, the distal end of which is connected with the release member 94 by means of a pin 134 which extends through an opening 136 formed in the projection 122 of member 94, as shown in FIGURE 7.

The ends of the pin 134 may be riveted or swaged, the pin providing a pivotal connection between the rod 132 and the member 94.

The servo-motor housing 130 is provided with a spud or a nipple 138 to which is connected a tubular member 140, the tube 140 being in communication with a source of differential fluid pressure as, for example, reduced or sub-atmospheric pressure existent in the intake manifold of the engine of the vehicle during engine operation.

A valve (not shown) of conventional construction is associated with the tube 140 or otherwise disposed to control the transmission of reduced pressure to the diaphragm of the servo-motor 130 to effect pivotal movement of the release member 94 in a counterclockwise direction, as viewed in FIGURES 2 and 4, to engage the lug 124 thereof with the distal portion 118 of the coiled element 106 to release the drum. It is to be understood that other types of motive power may be used in lieu of the fluid pressure actuated servo-motor 130 to accomplish release of the locking means 106. Furthermore, the provision of the projection 120 on the release member 94 enables either hand or foot-operation of the release means in the event of power failure of the servo-motor 130.

The support member 44 is provided with a pin or rivet 148 upon which is mounted a bumper or buffer 150 which is engaged by the lever or member 60 upon its return to brake release position. The member 150 is preferably fashioned of semi-hard rubber or similar material to cushion the shock or impact of the return movement of the member or lever 60.

The number of convolutions in the spring or coiled element 106 may be three or more, and tests have indicated that about seven convolutions provide an effective operating arrangement for retaining parking brakes in set position.

The method of operation of applicant's invention is particularly novel in several respects. The retaining means including the drum 88 and coiled element 106 are spaced substantially from the fulcrum or pivotal support of the lever or member 60 and the drum 88 of the retaining means is operated by movement of the brake actuating member through motion multiplying media which, in the embodiment illustrated, is provided by the rack portion 78 and the pinion 80 whereby the amount of frictional force required between the drum and the locking member or spring 106 to lock the drum is greatly reduced.

The method provides for an effective means to retain brake operating member or lever in any brake setting position without any cable "back-off" and wherein the locking or retaining member 106 may be quickly and easily released by the application of a comparatively small force applied to the release member 94 through the projection 120 by hand or foot-operation or by the power or servo-motor unit 130.

While in the embodiment illustrated, the brake actuating cable 37 is attached to the member 60, it is to be understood that the member or plate 66 may be provided with an extension arranged to be connected to the clevis 39 which is secured to the brake actuating cable 37.

It is apparent that, within the scope of the invention, modifications and different arrangements may be made other than as herein disclosed, and the present disclosure is illustrative merely, the invention comprehending all variations thereof.

I claim:

1. Mechanism for controlling brakes of a vehicle including, in combination, a support means, a brake actuator mounted on the support means for movement relative thereto, an element journaled on the support means for rotation about an axis spaced from the actuator, a pinion portion rotatable with the element, a toothed rack portion movable with the acuator, the teeth of the rack portion being enmeshed with the pinion portion whereby relative movement of the actuator effects rotation of the rotatable element, a constriction element embracing the rotatable element, said constriction element being shaped to engage and retain the rotatable element in positions to which it is moved by the actuator, said constriction element having terminal portions, one of said terminal portions being anchored in a relatively fixed position, the other terminal portion being unrestricted for movement in a direction relative to the fixed terminal portion to effect a release of the constriction element from the rotatable element.

2. Mechanism for controlling brakes of a vehicle including, in combination, a support means, a brake actuator pivotally mounted on the support means for movement relative thereto, a rotatable element journaled on the support means on an axis spaced from the pivotal axis of the actuator, a pinion portion rotatable with the element, a toothed rack portion movable with the actuator, the teeth of the rack portion being enmeshed with the pinion portion, locking means for the rotatable element comprising a coiled element embracing the rotatable element, said coiled element normally frictionally engaging and retaining the rotatable element in positions to which it is moved by the actuator, said coiled element having terminal portions, means anchoring one of said terminal portions in a relatively fixed position, the other terminal portion being unrestricted for movement relative to the anchored terminal portion to effect a release of the coiled element with the rotatable element.

3. Mechanism for controlling parking brakes of a vehicle including, in combination, support means, a member mounted on the support means for pivotal movement relative thereto to actuate the vehicle parking brakes, a cylindrically shaped element mounted on the support means for rotation about an axis spaced from the pivotal axis of said member, a pinion portion rotatable with the element, a toothed rack portion movable with said member, the teeth of the rack portion being enmeshed with the pinion portion whereby said element is rotated through relative pivotal movement of said member, a locking means for said cylindrically shaped element, said locking means including convolutions of linear material embracing the cylindrically shaped element for frictionally engaging said element, the thickness of the linear material providing the convolutions being substantially less than its width, one end region of the linear material being anchored against relative movement, and the other end region of the linear material being relatively movable to effect release of the convolutions of linear material with the cylindrically shaped element.

4. Mechanism for controlling brakes of a vehicle including, in combination, a support, a member mounted upon the support for pivotal movement relative thereto, means establishing an operative connection between the brakes and said member, said member being movable to positions to effect a setting of the brakes, a drum journaled for rotation about an axis spaced from the pivotal axis of said member, a pinion portion rotatable with the drum, a toothed rack portion movable with the member, the teeth of the rack portion being enmeshed with the pinion portion whereby relative pivotal movement of said member effects rotation of said drum, a retaining element for said drum, said retaining element having a plurality of convolutions embracing said drum and arranged to lock the drum in positions to which it is moved by said member, said retaining element having terminal portions, one of said terminal portions being retained in a relatively fixed position, the other of said terminal portions movable in a direction relative to the fixed terminal portion to effect a release of the rotatable drum.

5. Mechanism for controlling parking brakes of a vehicle including, in combination, a support, a foot operated lever fulcrumed on the support, means operatively connecting the lever with the vehicle parking brakes, a cylindrical element rotatably mounted on the support at a region spaced from the fulcrum of the lever, a pinion rotatable with the element, a sector component actuated by the lever and provided with teeth enmeshed with the teeth of the pinion, a coiled locking element for the cylindrical element having convolutions embracing the cylindrical element for frictionally locking the cylindrical element against rotation in one direction, said locking element having a first terminal portion anchored to the support, and a second unsecured terminal portion movable to a position to release the convolutions from locking engagement with the cylindrical element.

6. Mechanism for controlling parking brakes of a vehicle including, in combination, a support, a foot operated lever fulcrumed on the support, means connected with the lever adapted upon movement of the lever in one direction to effect a setting of the parking brakes, a drum journaled on the support on an axis spaced from the fulcrum of the lever, a pinion secured to the drum, sector means movable with the lever and having a toothed rack portion enmeshed with the pinion, a locking means for the drum comprising a coil spring having about seven convolutions surrounding said drum and stressed to normally frictionally engage the drum, said spring having a first terminal portion anchored to the support, said spring having a second terminal portion being unsecured, and power actuated means for effecting relative movement of the second terminal portion to release the drum.

References Cited by the Examiner

UNITED STATES PATENTS

| 823,971 | 6/1906 | Remondy | 74—531 X |
| 1,914,510 | 6/1933 | Johnson et al. | 74—531 |
| 2,117,925 | 5/1938 | Van Meter | 74—531 X |
| 2,897,686 | 8/1959 | Hinsey | 74—507 X |
| 3,069,764 | 12/1962 | Swats et al. | 74—539 X |

FOREIGN PATENTS 550,012  12/1957  Canada.

MILTON KAUFMAN, *Primary Examiner.*

BROUGHTON G. DURHAM, *Examiner.*